(12) United States Patent
Baker

(10) Patent No.: US 10,956,818 B2
(45) Date of Patent: Mar. 23, 2021

(54) DATA SPLITTING BY GRADIENT DIRECTION FOR NEURAL NETWORKS

(71) Applicant: D5AI LLC, Maitland, FL (US)

(72) Inventor: James K. Baker, Maitland, FL (US)

(73) Assignee: D5AI LLC, Maitland, FL (US)

(*) Notice: Subject to any disclaimer, the term of this patent is extended or adjusted under 35 U.S.C. 154(b) by 0 days.

(21) Appl. No.: 16/618,931

(22) PCT Filed: Jun. 1, 2018

(86) PCT No.: PCT/US2018/035598
§ 371 (c)(1),
(2) Date: Dec. 3, 2019

(87) PCT Pub. No.: WO2018/226527
PCT Pub. Date: Dec. 13, 2018

(65) Prior Publication Data
US 2020/0134451 A1 Apr. 30, 2020

Related U.S. Application Data

(60) Provisional application No. 62/516,785, filed on Jun. 8, 2017.

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
None
See application file for complete search history.

(56) References Cited

U.S. PATENT DOCUMENTS

| 6,272,449 B1 | 8/2001 | Passera |
| 2011/0026770 A1 | 2/2011 | Brookshire |

(Continued)

FOREIGN PATENT DOCUMENTS

| CN | 106056164 A | 10/2016 |
| WO | WO 2018/175098 A1 | 9/2018 |

(Continued)

OTHER PUBLICATIONS

Goodfellow, et al., Deep Learning, <deeplearningbook.org>, 2016, pp. 1-802 (See, pp. 258-259, 294 (average gradient), 304 (minibatch)) (Year: 2016).*

(Continued)

*Primary Examiner* — Wilbert L Starks

(57) ABSTRACT

Systems and methods improve the performance of a network that has converged such that the gradient of the network and all the partial derivatives are zero (or close to zero) by splitting the training data such that, on each subset of the split training data, some nodes or arcs (i.e., connections between a node and previous or subsequent layers of the network) have individual partial derivative values that are different from zero on the split subsets of the data, although their partial derivatives averaged over the whole set of training data is close to zero. The present system and method can create a new network by splitting the candidate nodes or arcs that diverge from zero and then trains the resulting network with each selected node trained on the corresponding cluster of the data. Because the direction of the gradient is different for each of the nodes or arcs that are split, the nodes and their arcs in the new network will train to be different. Therefore, the new network is not at a stationary point.

51 Claims, 9 Drawing Sheets

(56) References Cited

U.S. PATENT DOCUMENTS

2014/0180989 A1 6/2014 Krizhevsky et al.
2015/0019214 A1 1/2015 Wang et al.
2019/0095798 A1 3/2019 Baker

FOREIGN PATENT DOCUMENTS

| WO | WO 2018/194960 A1 | 10/2018 |
| --- | --- | --- |
| WO | 2018226527 A1 | 12/2018 |
| WO | WO 2018/226492 A1 | 12/2018 |
| WO | WO 2018/226527 A1 | 12/2018 |
| WO | WO 2018/231708 A2 | 12/2018 |
| WO | WO 2019/005507 A1 | 1/2019 |
| WO | WO 2019/005611 A1 | 1/2019 |
| WO | WO 2019/067236 A1 | 4/2019 |
| WO | WO 2019/067248 A1 | 4/2019 |
| WO | WO 2019/067281 A1 | 4/2019 |
| WO | WO 2019/067542 A1 | 4/2019 |
| WO | WO 2019/067831 A1 | 4/2019 |
| WO | WO 2019/067960 A1 | 4/2019 |
| WO | WO 2019/152308 A1 | 8/2019 |

OTHER PUBLICATIONS

Goodfellow, et al., Deep Learning, <deeplearningbook.org>, 2016, pp. 1-802 (Year: 2016).*
Du, et al., Adapting Auxiliary Losses Using Gradient Similarity, arXiv, 2018, pp. 1-16 (Year: 2018).*
International Search Report and Written Opinion for International PCT Application No. PCT/US2018/035598 dated Aug. 23, 2018.

* cited by examiner

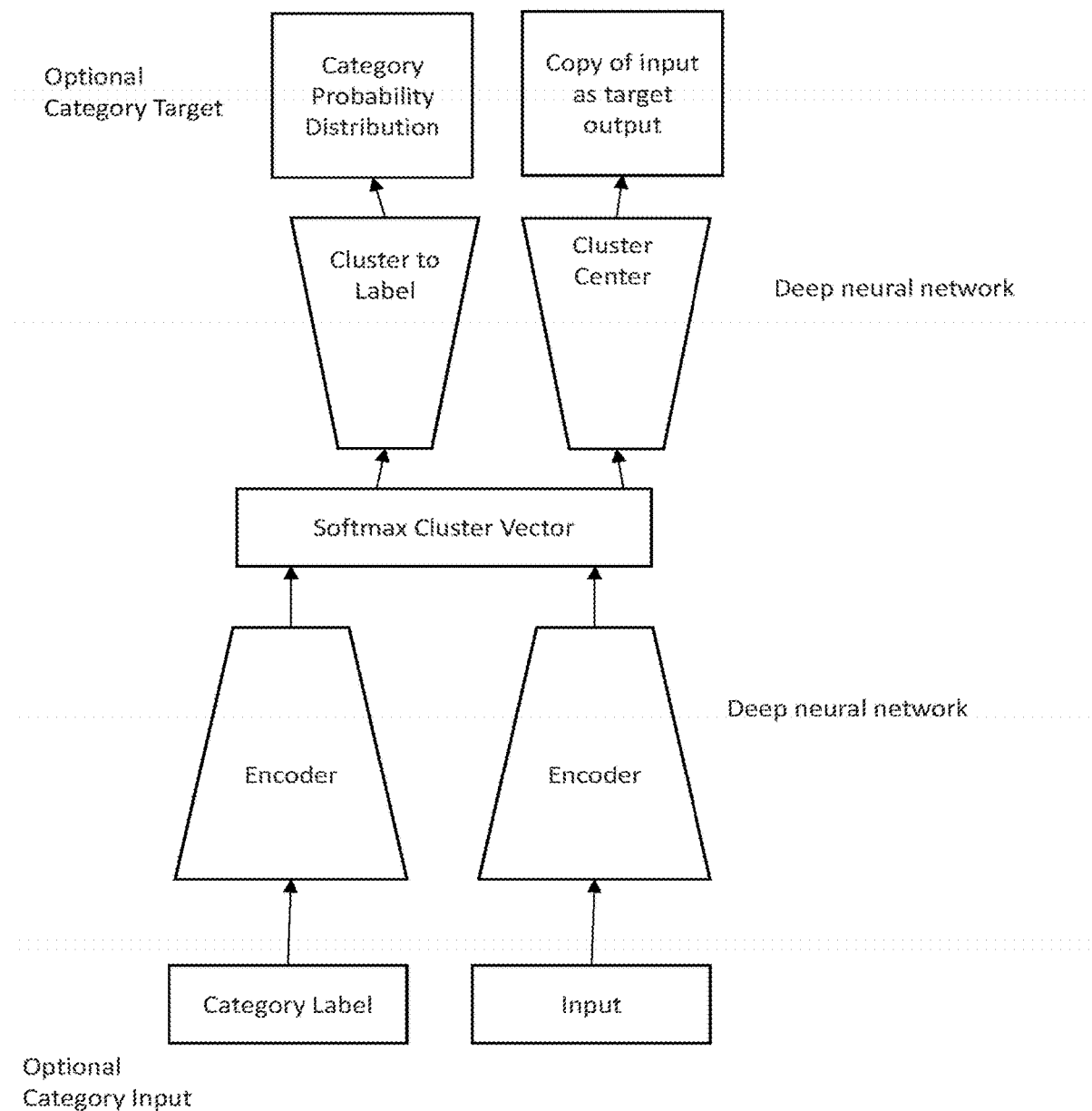
Figure 6: Supervised Training of Autoencoder with a Softmax Cluster Vector

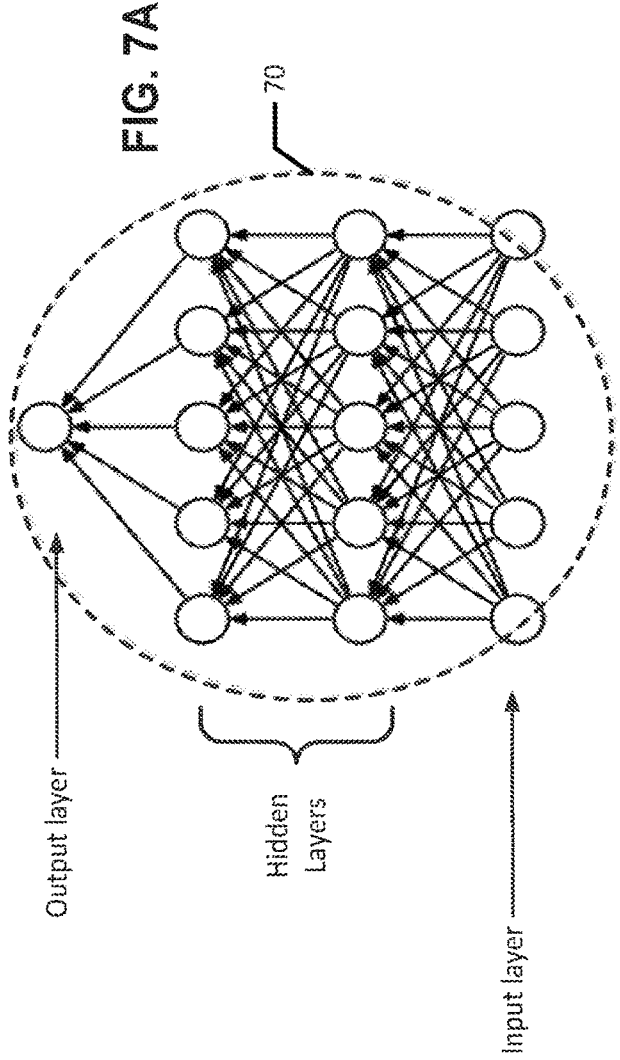

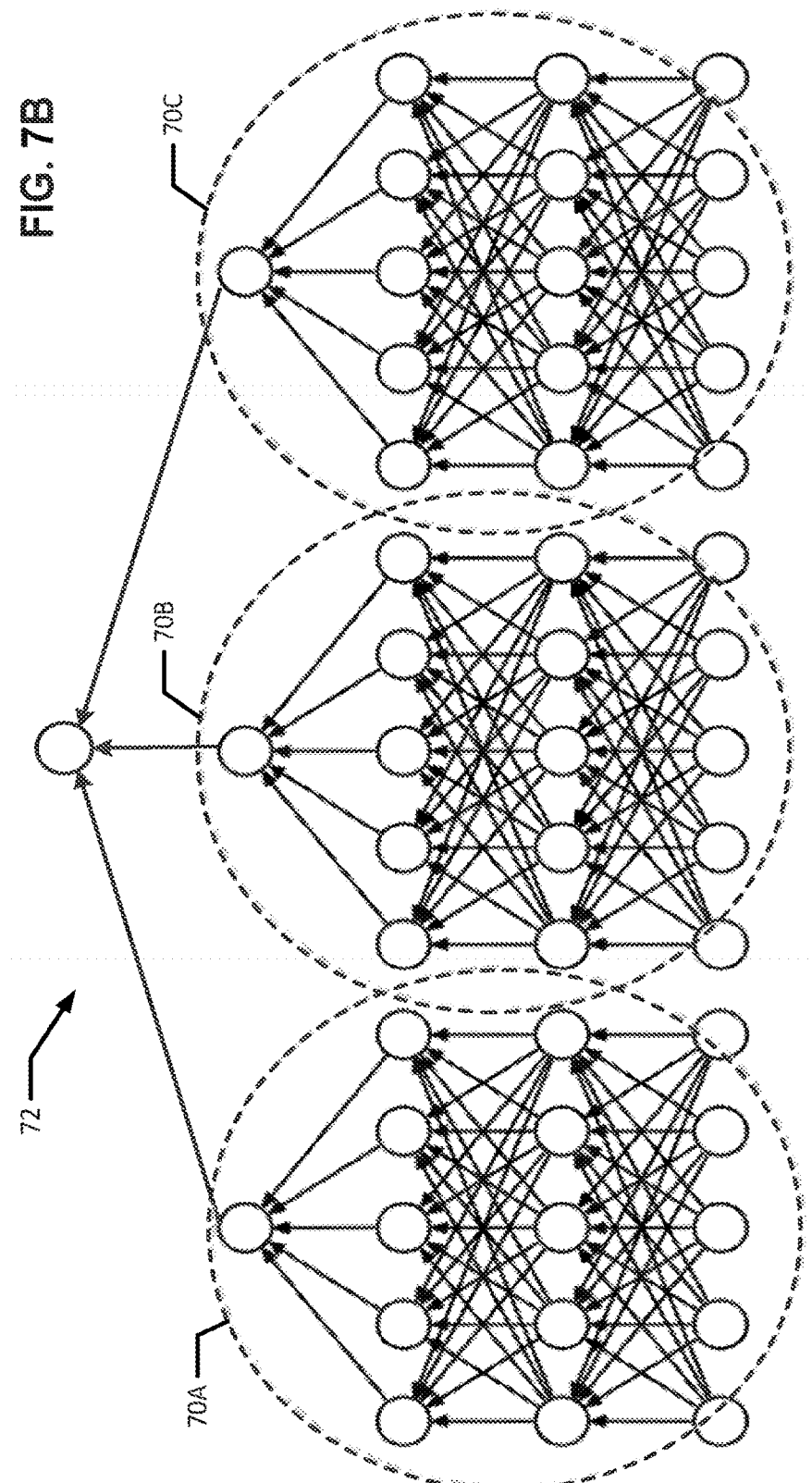

US 10,956,818 B2

DATA SPLITTING BY GRADIENT DIRECTION FOR NEURAL NETWORKS

PRIORITY CLAIM

The present application is a national stage application under 35 U.S.C. § 371 of PCT application Serial No. PCT/US18/35598, filed Jun. 1, 2018, entitled "Data Splitting by Gradient Direction for Neural Networks," which claims priority to U.S. provisional patent application Ser. No. 62/516,785, filed Jun. 8, 2017, entitled "Data and Node Splitting by Gradient Direction," both with the same inventor as identified above, and both of which are is incorporated herein by reference in its their entirety.

BACKGROUND

Machine learning is a process implemented by computers to self-learn algorithms that can make predictions on data through building models from sample data inputs. There are many types of machine learning system, such as artificial neural networks (ANNs), decision trees, support vector machines (SVMs), and others. These systems first have to be trained on some of the sample inputs before making meaningful predictions with new data. For example, an ANN typically consists of multiple layers of neurons. Each neuron is connected with many others, and links can be enforcing or inhibitory in their effect on the activation state of connected neurons. Each individual neural unit may have a summation function which combines the values of all its inputs together. There may be a threshold function or limiting function on each connection and on the neuron itself, such that the signal must surpass the limit before propagating to other neurons. The weight for each respective input to a node can be trained by back propagation of the partial derivative of an error cost function, with the estimates being accumulated over the training data samples. A large, complex ANN can have millions of connections between nodes, and the weight for each connection has to be learned.

ANNs are trained on training data until they converge to a minimum in the error cost function. Once ANNs are trained to convergence, no techniques currently exist to further improve the performance of the network without making changes to the structure of the network. Furthermore, there is no systematic way to make changes in the network that will improve performance. This can be problematic because there is a constant desire to make ANNs perform more efficiently, especially as they grow larger and more complex.

SUMMARY

In one general aspect, the present invention is directed to a computer-implemented systems and methods for improving the performance of a network that has converged such that the gradient of the network and all the partial derivatives are zero (or close to zero). In one embodiment, the method comprises splitting training data for the network into N groups of training data, where N>1, based on similarity of gradient direction. Then, the neural network is trained (or re-trained), where each of N sub-network portions of the neural network is trained on a respective one of the N groups of training data. The training data may be split such that, on each subset of the split training data, some nodes or arcs (i.e., connections between a node and previous or subsequent layers of the network) have individual partial derivative values that are different from zero on the split subsets of the data, although their partial derivatives averaged over the whole set of training data is close to zero. In particular embodiments of the present invention, a new, improved network is created by splitting one or more candidate nodes or arcs in the neural network that diverge from zero and then training the resulting network with each selected node trained on the corresponding group (or cluster) of the data.

Because the direction of the gradient is different for each of the nodes or arcs that are split, the nodes and their arcs in the new network will train to be different. Therefore, the new network is not at a stationary point, i.e., is not at a minimum. When the new network is trained from an initial point that matches the previously trained minimum, it can result in a reduction in the error cost function, thereby improving the performance of the network. The splitting of the data by gradient similarity is crucial. The node splitting by itself would not be nearly as effective because the gradients would still be close to zero.

These and other benefits from embodiments of the present invention will be apparent from the description that follows.

FIGURES

Various embodiments of the present invention are described herein by way of example in conjunction with the following figures, wherein:

FIG. 6 is a block diagram illustrating a clustering process used in accordance with one or more aspects of the present invention;

Figure 8A:
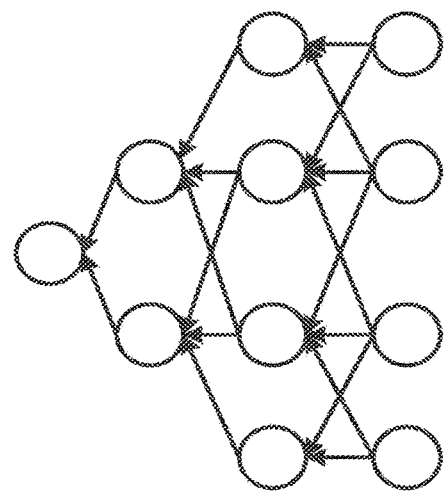
Figure 8C:
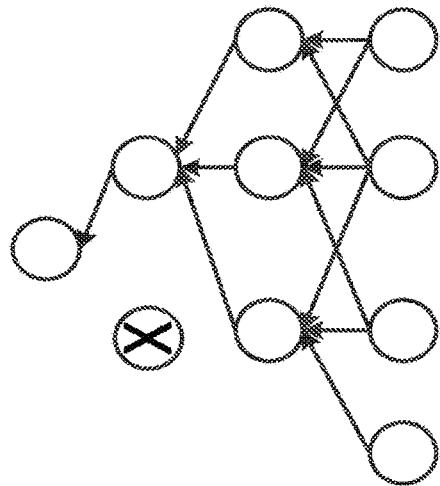
Figure 8B:
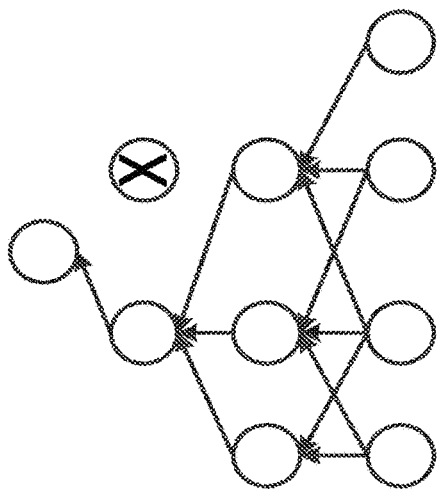

FIG. 7A-B illustrate an embodiment where an ensemble network comprises ensemble members that are duplicates of a base neural network, such that each ensemble member can be trained on a different cluster or group of training data that are clustered or grouped by gradient direction; and FIGS. 8A-C illustrate an embodiment where different sub-networks of a base neural network are trained on a different cluster or group of training data that are clustered or grouped by gradient direction.

DETAILED DESCRIPTION

The present disclosure describes a system and method for improving the performance and robustness of a neural network after that network has already been trained to convergence at or near a minimum in its error cost function. Neural networks are typically trained by an iterative process such as stochastic gradient descent. In stochastic gradient descent, the gradient is estimated on small batches of data called "minibatches." The estimate of the gradient on each minibatch is only a random sample estimate of the gradient on the full set of training data. Therefore, the iterative training process does not fully converge in the mathematical sense, but merely gets close to a minimum in the cost function, with a small random fluctuation from one minibatch to another.

Even the gradient on the full set of training data is only an estimate of the gradient of the true function, so the error on the training data may not be the same as the error on independent validation data. Therefore, in iterative training of neural networks, there is usually a stopping criterion that stops the iterative training when further iterations appear to be providing no consistent improvement in performance. Thus, the gradient of the error cost function, which would be zero at the minimum of the error cost function, may merely be close to zero but not exactly zero at the point at which the training is terminated.

An iterative training process that has been terminated by such a stopping rule is said to be "converged," although it is not fully converged in the mathematical sense. For the purpose of continued training, there is little practical difference between an iterative process that has mathematically converged to a stationary point, with a gradient of zero, and an iterative process with a stopping rule that has been stopped at a point close to such a stationary point. A slight random perturbation to a process that is exactly at a stationary point produces the same situation as a stopping rule, a point that is close to a local minimum. However, in both cases, continued learning will be slow because the magnitude of the gradient is very small and estimates of the gradient are noisy.

The present system and method can make improvements to the already-trained neural network even if the minimum that the neural network has been trained to is the global minimum. The present system and method selectively changes the structure of the trained neural network to create a new network or ensemble with a lower error cost and with greater robustness.

Figure 1:
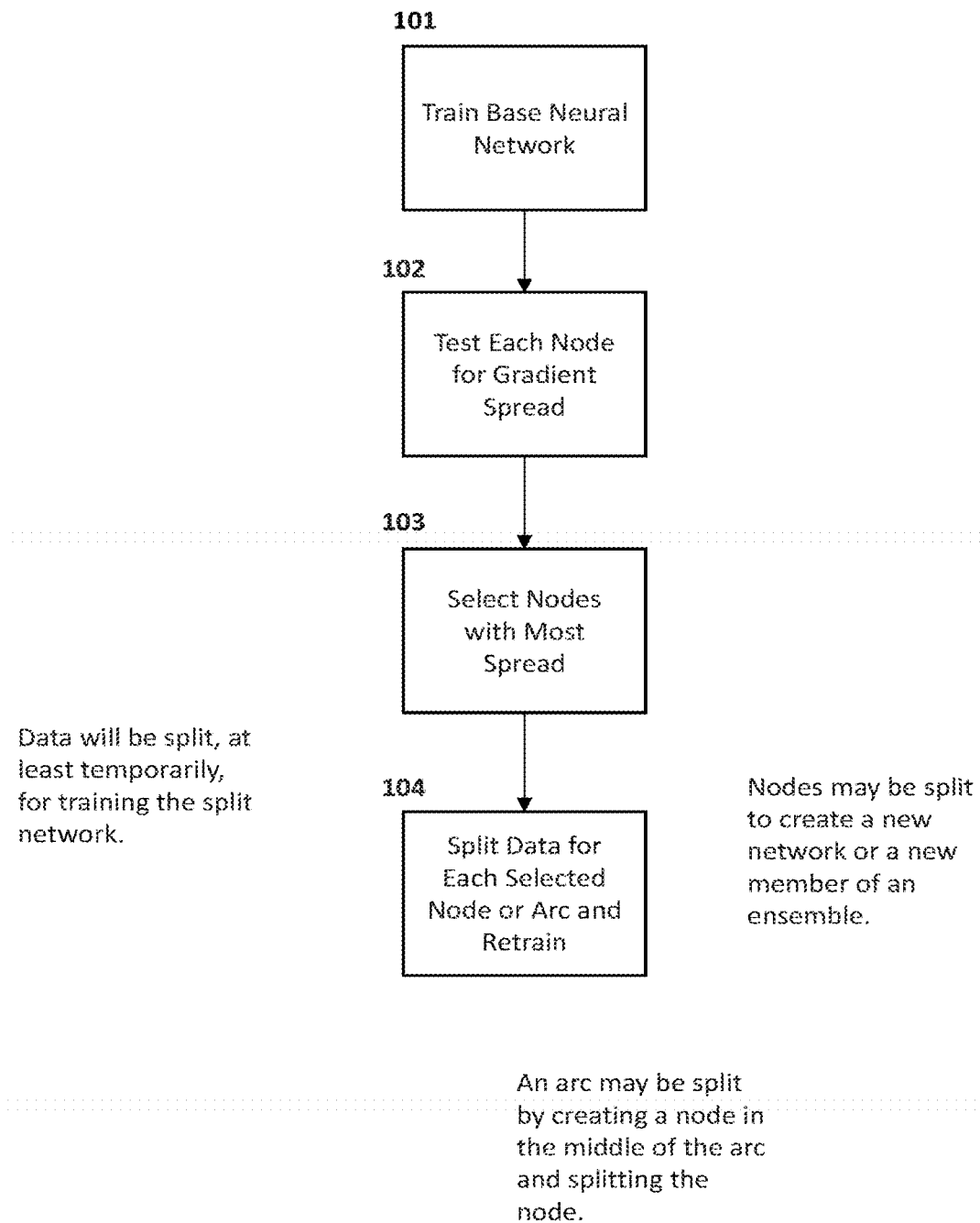
FIG. 1 is a logic flow diagram illustrating a process for splitting the data for training a network with split components according to the direction of the gradient, in accordance with one or more aspects of the present disclosure.

FIG. 1 is a logic flow diagram of a process for splitting data for training a split network according to the direction of the gradient, in accordance with one or more aspects of the present disclosure. An example computer system for performing the process of FIG. 1 according to various embodiments of the present invention is described below in connection with FIG. 5. The first step in the process is to train 101 the base network to convergence or to some other designed stopping point. The base network can be trained to convergence via any means known in the art for training machine learning systems, such as by stochastic gradient descent with the partial derivatives computed by back propagation and with updates computed in minibatches. An illustrative embodiment of such a training technique is shown in the following pseudo-code:

---

Pseudocode of stochastic gradient descent with
gradient normalization and learning coach control

---

1. $a_{l-1,0}(m) = 1$, is constant, so $w_{l,0,j}$ is a bias for node j in layer l
2. For each epoch until stopping criterion is met
   a. Input a set (minibatch number t) of training examples; repeat for each minibatch in epoch
      1. For each training example m, set $a_{0,j}(m)$ and perform the following steps:
         1. Feedforward (softmax output): For each $l = 1, 2, \ldots, L-1$
            compute $z_{l,j}(m) = \sum_{i=0}^{n_l} w_{l-1,i,j} a_{l-1,i}(m)$, $a_{l,j}(m) = \sigma(z_{l,j}(m); T_{l,j,t})$;

---

Pseudocode of stochastic gradient descent with
gradient normalization and learning coach control

---

2. Softmax output: $a_{L,k} = e^{z_k/T_{L,k,t}} / \left(\sum_j e^{z_j/T_{L,j,t}}\right)$; $s_{L,n} = 1$;

3. Output error gradient (m):
   1. $\delta_{L,j}(m) = -\dfrac{y_j(m) - a_{L,j}(m)}{n_L T_{L,j,t}}$ 4. Backpropagate error gradient: For each $l = L-1, L-2, \ldots, 2, 1$ compute
   $$\delta_{l-1,i}(m) = \left(a_{l-1,i}(m)(1 - a_{l-1,i}(m)) \sum_{j=1}^{n_l} w_{l,i,j} \delta_{l,j}(m)\right) / (s_{l-1} T_{l-1,i,t})$$

2. Compute gradient for minibatch:
   $$\Delta_{l-1,i} = \sum_{m=1}^{M} a_{l-1,i}(m) \delta_{l,j}(m) / M$$

3. Compute momentum:
   $v_{l,i,j} \to v'_{l,i,j} = \mu_{l,i,j} v_{l,i,j} - \eta_{l,i,j} \Delta_{l-1,i}$
4. Compute norm for layer:
   $s_l = \text{Max}_i |\Delta_{l,i}|$
5. Gradient descent: For each $l = L-1, L-2, \ldots, 2, 1$ update the weights
   $w_{l,i,j} \to w'_{l,i,j} = w_{l,i,j}(1 - \lambda_{l,i,j}) - v'_{l,i,j}$

---

After the base network is trained, the process evaluates 102 each node in the base network as a candidate for splitting and then selects 103 the best candidates for splitting. Various embodiments of systems and methods for evaluating 102 and selecting 103 candidates for splitting will be discussed in further detail with reference to FIG. 2. In one embodiment, after the best candidates have been selected, the process then creates 104 a new network by creating two or more new nodes in place of each selected node from the population of candidate nodes. Various embodiments of systems and methods for creating a new network will be discussed in further detail with reference to FIG. 3.

Figure 2:
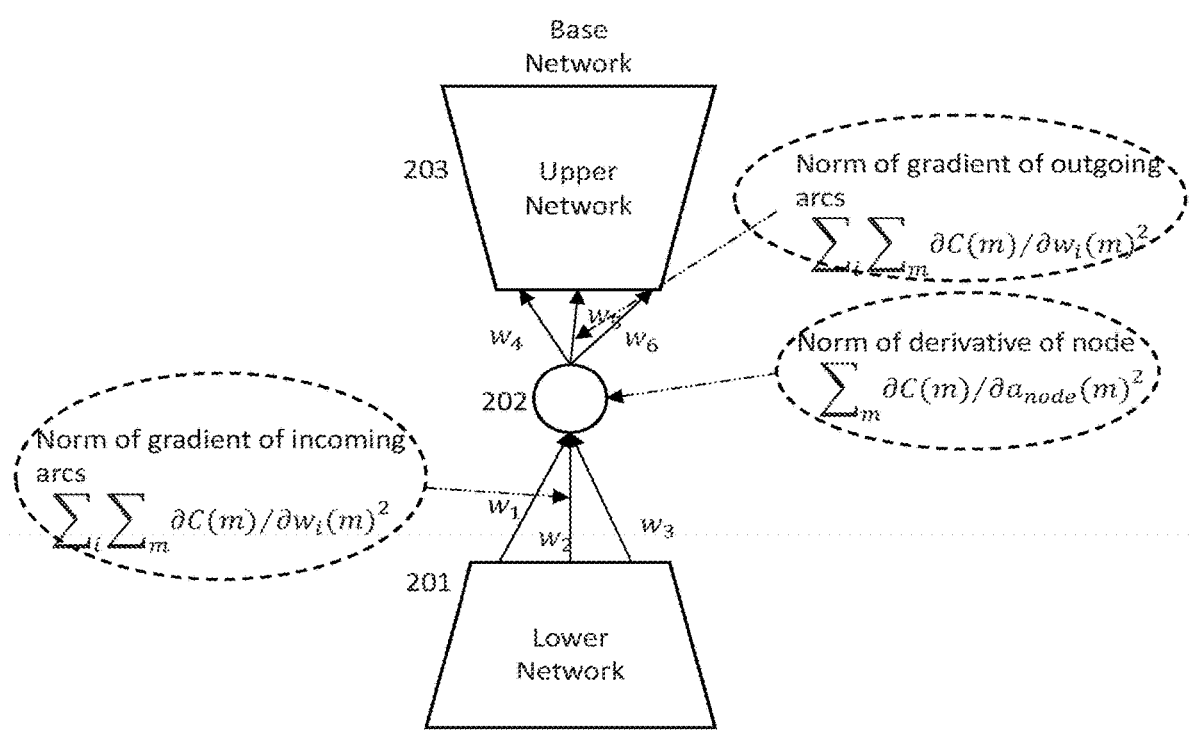
FIG. 2 is a block diagram illustrating a system for evaluating candidates for splitting, in accordance with one or more aspects of the present disclosure.

FIG. 2 is a block diagram illustrating a system for evaluating candidates for splitting, in accordance with one or more aspects of the present disclosure. In an illustrative embodiment, the base network has already been trained to convergence by stochastic gradient descent. Training a network to convergence implies that the gradient and all the partial derivatives are zero, or at least close to zero (within a threshold range around zero), when estimated on the training data. The gradient estimated on the training data, as a whole, is the average of estimates for individual data examples, which in FIG. 2 are denoted by the quantities being a function of the example number, m. The gradient being zero means that the average value of the partial derivative of the error cost function is zero for each node and each arc in the network, when averaged across all the training data. However, the gradient values for individual training examples may be very different from zero. The illustrative examples in FIG. 2 compute the norm of the partial derivatives summed over the training data for each node 202 situated in a layer of a base network, wherein each node 202 receives inputs with weights $w_n$ for n connections from the lower portion 201 of the network and produces outputs with weights $w_n$ for n connections that are received by the upper portion 203 of the network. Three illustrative examples of techniques for computing the norm of the partial derivatives are shown: (1) the norm 210 of the partial derivatives for the node itself $\Sigma_m(\partial C(m)/\partial a_{node})^2$; (2) the norm 211 of the gradient of the weights on the arcs coming into the node $\Sigma_i \Sigma_m (\partial C(m)/\partial w_i)^2$, where i ranges over incoming arcs; or (3) the norm 212 of the gradient of the weights on arcs leaving the node $\Sigma_i \Sigma_m (\partial C(m)/\partial w_i)^2$, where i ranges over outgoing arcs.

Various embodiments can utilize any one of these norms or a combination thereof as the criterion for ranking the nodes for selection. In one embodiment, all of the nodes in the network are ranked according to the chosen technique and the nodes with the highest norms or all those with norms over a particular threshold value are selected. In another embodiment, only nodes in a single layer are evaluated, ranked, and selected at a time, since the further training of nodes in one layer will affect the partial derivatives of nodes and arcs in other layers. In yet another embodiment, only a single node is selected per application of the process.

Once a node or set of nodes has been selected, the selected data examples are clustered into two or more clusters. One vector to be clustered is obtained for each training example. For example, the vector could be the set of partial derivatives with respect to a set of nodes $<\partial C(m)/\partial a_j>$, where m is for a single example and j ranges over a set of nodes. As another example, the vector could be the gradient with respect to the outgoing arcs or the incoming arcs for one or more selected nodes. For example, the vector for clustering can be a vector created by first computing a gradient vector for all the arcs leaving each selected node and then forming a longer vector by concatenating the vectors created for each of the selected nodes. In another illustrative embodiment, clustering is done separately for each selected node.

In an illustrative embodiment, the vectors are normalized to have unit length, because the direction of the gradient determines the subsequent further training to a larger degree than the length of the vector.

It is not essential that the clusters be well separated; rather, it is only necessary that at least two cluster centers be different enough to produce a difference during the further training of the network as modified. In other words, a data item or example does not have to be assigned to any of the data clusters, or it could be assigned to multiple clusters. Because the average gradient across all of the data is zero and the selected nodes have gradient norms that are significantly different from zero, it is easy to find two or more clusters that are significantly different, because their norms are non-zero but their average is zero. Any suitable clustering algorithm that generates sufficiently different clusters may be used. For example, in various embodiments, K-means clustering may be used. As another example, the vectors can be modeled as being drawn from a mixture of Gaussian distributions. The Gaussian mixture model can be trained, for example, by the well-known expectation-maximization (EM) algorithm and each mixture component is a cluster.

As an illustrative embodiment of this invention, the clustering of the concatenated gradient vectors may be done by supervised or unsupervised training of an autoencoder with a softmax vector as its bottleneck layer, as shown in FIG. 6. An autoencoder is a neural network that attempts to reproduce its input as well as it can with the network when forced to encode the input through a bottleneck layer. In the autoencoder shown in FIG. 6, the bottleneck layer is a softmax or hard max layer for which the node with the greatest activation indicates the cluster identity.

The illustrative embodiment shown in FIG. 6, adds an optional additional output objective of the category label, since the clustering is being done on training data with known category labels. In addition, this embodiment optionally uses the category label as additional input data. The maximum activation in the softmax bottleneck layer indicates the cluster associated with each input data item.

In the illustrative embodiment, the node splitting and subsequent training is determined by splitting the training data into the multiple groups, such as into the clusters by a clustering algorithm. More details about ways to split training data can be found in U.S. provisional application Ser. No. 62/518,302, entitled "Robust Anti-Adversarial Machine Learning," filed Jun. 12, 2017 and U.S. provisional application Ser. No. 62/623,773, entitled "Self-Organizing Partially Ordered Networks," filed Jan. 30, 2018, both of which are incorporated herein by reference in their entirety.

Figure 3:
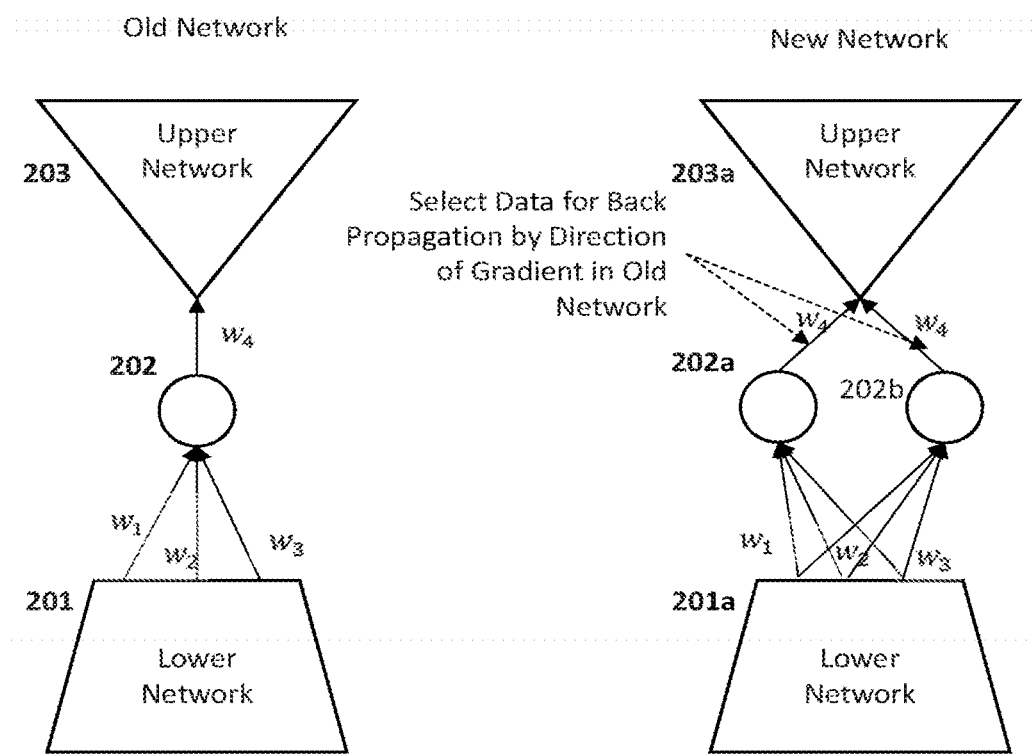
FIG. 3 is a block diagram illustrating a system that has been split according to the process of FIG. 1 and the block diagram of FIG. 2, in accordance with one or more aspects of the present disclosure.

In various embodiments, each selected node is split into multiple nodes, one new node for each cluster, as illustrated in FIG. 3. The left-hand side of FIG. 3 shows, by way of example, an "old network" or base network, having one node 202 in a layer between a lower portion/layer 201 of the network and an upper portion/layer 203 of the network. In this example, the node 202 has three incoming arcs from the lower layer 201, with weights $w_1$, $w_2$ and $w_3$, respectively. The node 202 in the old/base network has one outgoing arc to the upper layer 203, with weight $w_4$ in this example. After splitting node 202, the "new network," shown on the right-hand side of FIG. 3, includes a node set with, in this example, N=2 new nodes, i.e., nodes 202a, 202b. Each new node 202a, 202b has the same number of incoming and outgoing arc as the node 202 in the old network. Also, the weights for the incoming and outgoing arcs for the new nodes 202a, 202b can be initially set to be equal to the weights of the node 202 of the old network, as depicted in FIG. 3. Of course, in other embodiments, the new node set could include a greater number of new nodes than two; that is, in general, the number N of new nodes in the new node set could be N>2. Also, the node 202 in the old network that is split can have fewer and or greater incoming and outgoing arcs than the example illustrated in FIG. 3, with the new nodes 202a, 202b in the new node set having a corresponding number of incoming and outgoing arcs.

Then, for some amount of subsequent training on the new network with the new nodes 202a, 202b, for each item of training data, all but one node in each new node set is dropped out of the backpropagation computation in various embodiments of the preset invention. The one node that is not dropped is the one corresponding to the cluster for the current data input item. For example, with reference to the example in FIG. 3, there are N=2 training data clusters, with each of the new nodes 202a, 202b corresponding to one (and only one) of the clusters. When a training item from the cluster corresponding to the new node 202a is used, the new node 202b is dropped out, and vice versa. "Dropping out" in this context means that the node that is dropped out for a data item is ignored in training the network on that data item. In particular, the node could be ignored in the back-propagation phase of the training of the network on that data item. That is, the back-propagation is selectively stopped or interrupted from going through, or considering, the dropped-out node, e.g., the value of the dropped-out node for back propagation is set to zero.

The gradient estimate for each new node, and for each arc connected to that node will only include data from a given cluster. Because the clustering groups together data with similar gradients, and it separates into different clusters data that have different gradient directions, the vector of weights for arcs connected to a given new nodes will move in subsequent training in a different direction from any of the other nodes in a set of new nodes. In other words, although the network with the new node splits is initialized with weights that are equivalent to the original network before the splits, in the new network this configuration of weights is not near a stationary point. In fact, the new weights among the arcs connected to the new modes will quickly diverge from each other.

In one illustrative embodiment, the different data selection for the node associated with each cluster is done only for the first epoch of further training. After that, all the data is used for back propagation for all the nodes, except for normal dropout, if any.

In another illustrative embodiment, the entire base network is cloned, creating an ensemble with a copy the original network for each cluster. Each copy of the network is then trained just on data from the corresponding cluster. For example, as illustrated in FIGS. 7A-B, a base network 70 (shown in FIG. 7A) could be trained to convergence or to some other applicable training criterion. Then, if the training data is split by gradient direction into N groups (e.g., N clusters), an ensemble 72 comprising N ensemble members may be created, as shown in FIG. 7B, where each ensemble member 70A-C is a duplicate of the original base network 70, at least initially prior to training the ensemble. In this illustrative embodiment, N equals 3. For training data items in the first group, the ensemble members 70B and 70C could be dropped out (or otherwise ignored), while the first ensemble member 70A is trained with the data items in the first group. Similarly, for training data items in the second group, the ensemble members 70A and 70C could be dropped out (or otherwise ignored) while the second ensemble member 70B is trained with the data item in the second group; and so on.

In other embodiments, different sub-networks of a neural network could be trained with the different groups of data. For example, FIG. 8A illustrates a simple neural network and FIGS. 8B and 8C illustrate two different sub-networks of the network of FIG. 8A. In particular, each of the sub-networks shown in FIGS. 8B and 8C effectively dropped out the node that is "x-ed" out, so all incoming and outgoing arcs to the dropped out node are eliminated in the sub-network. As an example, assuming there are two groups of training data that are split by gradient direction, the sub-network of FIG. 8B could be trained on training data items in the first group of training data, and the sub-network of FIG. 8C could be trained on training data items in the second group. As can be appreciated, the network of FIG. 8A may have numerous sub-networks, which are not necessarily mutually exclusive (i.e., they can overlap).

For clarification purposes, with reference to FIGS. 7A-B and 8A-C, it should be noted that the neural networks described herein include an input layer, an output layer, and one or more hidden layers between the input and output layers, with each layer having one or more nodes. The nodes are represented by circles in these figures and the arcs between nodes are represented by arrows between the nodes. In these exemplary figures, no arc skips a layer but in other embodiments an arc in a network could skip one or more layers.

In some embodiments, a portion of the data from other clusters is mixed in with the data from the corresponding cluster.

As the new network is initialized identically to the old network, the new network's performance is initially identical to the base network. But, unlike the base network, the new network is not at a stationary point in the further training, i.e., is not converged at or near a local minimum for its training set. It is the splitting of the data that has been selected for different gradient directions that causes the training process to no longer be at a stationary point. The new network has nodes and arcs whose gradients are significantly different from zero. Therefore, the stochastic gradient descent in the further training will lead to reduction in the error cost function C. Because the new network is initialized to match the original network, the subsequent training gives improved performance over the previous network that had already been trained to convergence.

There are methods well known to those skilled in the art of optimization by gradient descent to increase the likelihood that a training process will converge to a local minimum with especially good performance. For example, a simple technique is to independently run iterative training from many different randomly selected starting points and then choose the one with the best performance. One illustrative embodiment of the invention starts the data and node splitting process with such a chosen best-performance network.

According to various embodiments, therefore, two innovations can combine to achieve an effect that superficially might seem to be impossible: a systematic process for improving the performance of a network that is already achieving its optimum performance. The node selection process provides a guide for selecting changes to the network to an expanded network that is capable of better performance than the optimum performance of the original network. The data splitting and specialized sub-network portion training (e.g., non-dropped out nodes) allows a gradient descent process to start with performance matching the previous optimum performance, yet have gradients with magnitudes that are substantially different from zero.

The node splitting by itself would not be as effective because the gradients of the error cost function would still be close to zero.

The data clustering and splitting has the further beneficial effect that the nodes in a new set of split nodes will tend to learn different features from each other. This beneficial effect also occurs in an illustrative embodiment in which the node splitting is used to create an ensemble of new networks.

The process of evaluating, splitting, and further training the network can be utilized iteratively to continue to improve the network as long as there are some nodes or arcs whose gradients are significantly different from zero on at least some data examples. Once the gradients of the individual data examples are all close to zero, the network will be stable and robust, because any small change in the input or in any of the activations of inner nodes will produce only a small change in the output as the partial derivatives will not only be zero when averaged across the training data, but also for each individual data example.

Figure 4:
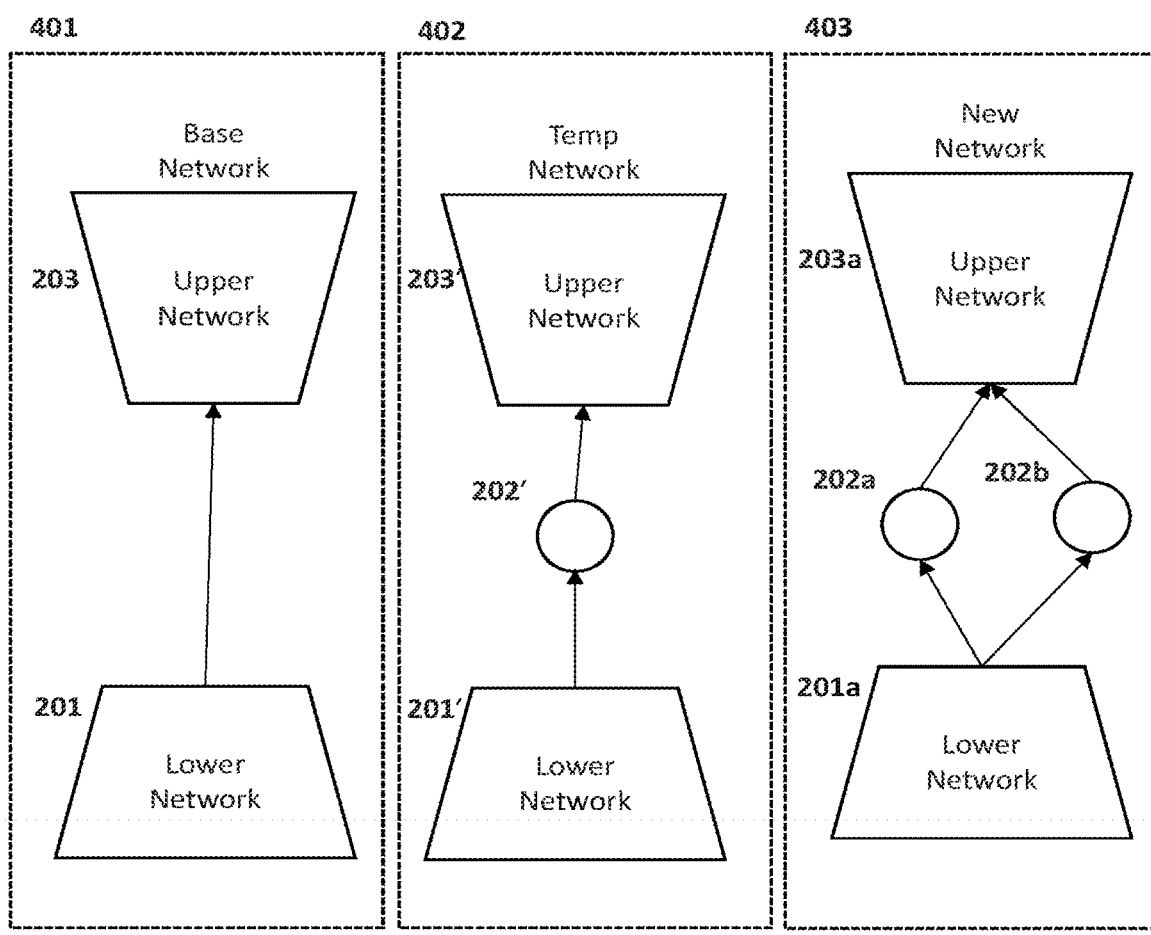
FIG. 4 is a block diagram illustrating a process and system wherein a single arc has been split without splitting all of the arcs associated with the node, in accordance with one or more aspects of the present disclosure.

FIG. 4 is a block diagram illustrating a process and system wherein a single arc has been split without splitting all of the arcs associated with the node, in accordance with one or more aspects of the present disclosure. It some cases, it may be desirable to split a single arc in isolation without disturbing all of the other arcs associated with the node, such as a situation wherein a single arc has a gradient that is significantly different than zero, but the node itself does not have a gradient that is significantly different than zero. The process begins with a base network 401 of a plurality of layers including a lower network 201 connected by an arc to an upper network 203. First, a temporary network 402 is created by introducing a dummy node 202' into the middle of the arc with the node initialized to be the identity function. For example, the node could have a rectified linear unit (ReLU) activation, with its bias and the bias of the destination node for the arc initially adjusted so the ReLU node 202' is initially in its linear region for all the data. Once the dummy node 202' has been added, a new network 403 can be created by splitting it into two or more nodes 202a, 202b, as previously described.

Figure 5:
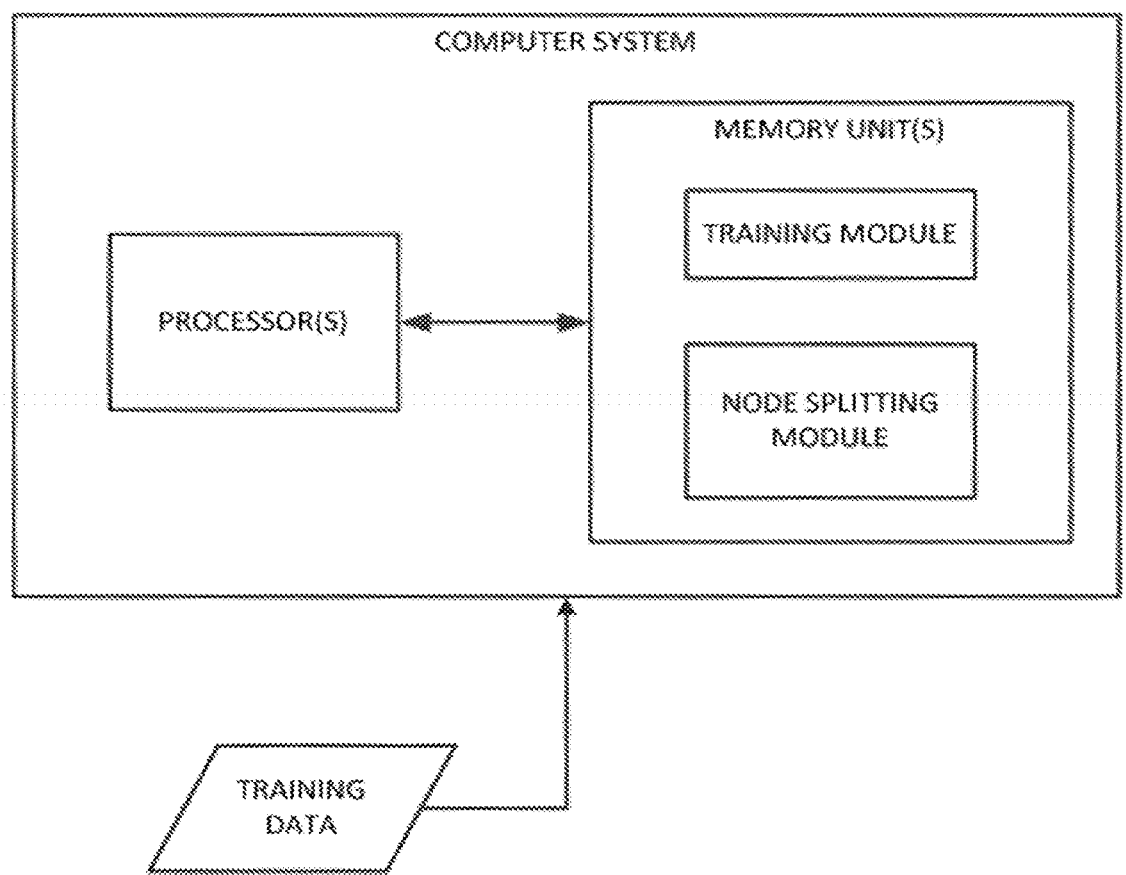
FIG. 5 is a block diagram of a computer system for performing the method illustrated in FIG. 1 in accordance with one or more aspects of the present invention.

The illustrative systems and methods described herein, including the system for splitting a network according to the direction of the gradient described in FIG. 1, the system for evaluating candidates for splitting described in FIG. 2, the system that has been split described in FIG. 3, the system for splitting a single arc without splitting all of the arcs associated with the node described in FIG. 4, and the system for supervised or unsupervised training of an autoencoder with a softmax bottleneck layer described in FIG. 6, can be implemented with computer hardware and software. For example, FIG. 5 is a diagram of a computer system for performing the method illustrated in FIG. 1 according to various embodiments of the present invention. As shown in FIG. 5, the computer system comprises one or more processors and one or more memory units. The memory unit(s) stored computer software that is executed by the processor(s). In particular, the software can include instructions that when executed by the processor(s) cause the processor(s) to perform the method of FIG. 1. For example, the memory unit(s) may comprise a training module that comprises software that, when executed by the processor(s), causes the processor(s) to train the based network to convergence. The memory unit(s) may also comprise a node splitting module that comprises software that, when executed by the processor(s), causes the processor(s) to perform the functions of steps 102-104 of FIG. 1, for example. The training data may be stored in a database that is in communication with the computer system or provided as a data feed over a data bus, for example.

Each processor could have one or multiple cores. The cores could be CPU, graphical processing unit (GPU) cores, and/or AI accelerators, for example. For example, in an embodiment with multiple CPU cores, one set of cores could execute the program instructions for training the base neural network, another set for evaluating each node for gradient spread, and so on. GPU cores operate in parallel and, hence, can typically process data more efficiently that a collection of CPU cores, but all the cores execute the same code at one time. An AI accelerator is a class of microprocessor designed to accelerate artificial neural networks, which have hundreds or thousands of parallel, relatively low-precision, processing units (or cores). The memory unit(s) may comprise computer memory that is accessible by the processing cores, such as RAM, ROM, processor registers or processor cache, for example.

As shown in FIG. 5, the computer system could be a single computer device, such as a single server. In other embodiments, the computer system may be implemented with a network of distributed computer devices, e.g., a network of servers that collectively perform the network splitting functions described herein. Data may be shared between the various computer devices using suitable data links, such as data buses (preferably high-speed data buses) or network links (e.g., Ethernet).

Embodiments of the present invention can be used to improve many different types of machine learning systems, including deep neural networks, in a variety of applications. For example, embodiments of the present invention can improve recommender systems, speech recognition systems, and classification systems, including image and diagnostic classification systems, to name but a few examples.

In one general aspect, therefore, the present invention is directed to methods and systems for generating an improved neural network. A method of generating an improved neural network according to embodiments of the present invention may comprise splitting first training data into N groups of training data, where N>1, based on similarity of gradient direction; and training a base neural network with the first training data, wherein the base neural network comprises N sub-network portions, and wherein each of the N sub-network portions is trained on a respective one of the N groups of training data. A computer system for generating an improved neural network according to embodiments of the present invention may comprise one or more computers, where the one or more computers comprise at least one processor and associated memory, where the associated memory stores software that when executed by the at least one processor, causes the at least one processor to: split first training data into N groups of training data, where N>1, based on similarity of gradient direction; and train a base neural network with the first training data, wherein the base neural network comprises N sub-network portions, and wherein each of the N sub-network portions is trained on a respective one of the N groups of training data.

According to various implementations, prior to training the base neural network, a first node of the base neural network is split into a node set that comprises N new nodes, such that one new node in the node set corresponds to one and only one of each of the N groups of training data. In that case, the step of training the base neural network comprises, for each data item in the first training data that belongs to one of the N groups of training data, dropping from the training for that data item all nodes in the node set that do not correspond to the group for the data item. In such an embodiment, the first node, prior to splitting, may comprise one or more incoming arcs and one or more outgoing arcs, with each of the incoming and outgoing arcs of the first node, prior to splitting, has a respective weight. In that case, splitting the first node into the new node set may comprise: having each new node in the new node set have the same number of incoming and outgoing arcs as the first node prior to splitting; and initializing the incoming and outgoing arcs of each new node in the new node set with equivalent weights as the first node prior to splitting, such that after the training, the weights for the incoming and outgoing arcs of each new node N in the new node set diverge. Also, training the base neural network may comprise, after dropping nodes for the first training data, training the base neural network, with the new node set, without dropping nodes for second training data that is different from the first training data.

In yet other implementations, prior to training the base neural network, an ensemble of N ensemble member networks is generated, where each of the N ensemble members is identical to the base neural network, and such that one ensemble member corresponds to one and only one of each of the N groups of training data. In that case, the step of training the base neural network may comprise training the ensemble, wherein, for each data item in the first training data that belongs to one of the N groups of training data, training the ensemble comprises dropping from the training for that data item all ensemble members in the ensemble that do not correspond to the group for the data item. In such embodiments, training the ensemble may comprise, after dropping ensemble members for the first training data, training the ensemble without dropping ensemble members for second training data that is different from the first training data In various implementations, prior to training the base neural network with the first training data, the base neural network is pre-training to a desired performance level, such as to convergence, which may comprise iteratively pre-training the base neural network through gradient descent until a gradient of an applicable error cost function is below a threshold minimum.

In addition, splitting the first training data into N groups may comprise clustering the first training data into N clusters. This may be done by generating a vector for each training example in the first training data and clustering the vectors into N clusters. The clustering may also be performed with a clustering algorithm and/or by training an autoencoder with a bottleneck layer.

The software for the various machine learning systems described herein, such as the software modules shown in FIG. 5, and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method of generating an improved neural network, the method comprising:
    pre-training, by a computer system, a base neural network;
    after pre-training the based neural network, splitting, by the computer system, a first set of training data into N groups of training data, where N>1, wherein the splitting of the first set of training data into the N groups is based on similarity of a gradient direction of an error cost function with respect to the first set of training data, such that training data items in each of the N groups, respectively, have a similar gradient direction of the error cost function and such that the respective N groups have different gradient directions averaged over the training data items for each respective group; and
    after splitting the first set of training data into the N groups, re-training, by the computer system, the base neural network with the first set of training data, wherein the base neural network comprises N sub-network portions, and wherein each of the N sub-network portions is trained on a respective one of the N groups of training data.

2. The method of claim 1, wherein:
    the method further comprises, prior to re-training the base neural network, splitting, by the computer system, a first node of the base neural network into a node set that comprises N new nodes, such that one new node in the node set corresponds to one and only one of each of the N groups of training data; and
    the step of re-training the base neural network comprises, for each data item in the first set of training data that belongs to one of the N groups, dropping from the re-training for that data item all nodes in the node set that do not correspond to the group for the data item.

3. The method of claim 2, wherein:
    the first node, prior to splitting, comprises one or more incoming arcs and one or more outgoing arcs, with each of the incoming and outgoing arcs of the first node, prior to splitting, has a respective weight; and
    splitting the first node into the new node set comprises:
        having each new node in the new node set have the same number of incoming and outgoing arcs as the first node prior to splitting; and
        initializing the incoming and outgoing arcs of each new node in the new node set with equivalent weights as the first node prior to splitting, such that after the re-training, the weights for the incoming and outgoing arcs of each new node N in the new node set diverge.

4. The method of claim 2, wherein re-training the base neural network comprises, after dropping nodes for the first set of training data, re-training the base neural network, with the new node set, without dropping nodes for a second set of training data that is different from the first set of training data.

5. The method of claim 2, wherein splitting the first set of training data into the N groups comprises:
    computing a norm of partial derivatives over the first set of training data for each node in the base neural network; and
    grouping the first set of training data into the N groups based on similarity of gradient direction.

6. The method of claim 5, further comprising, prior to splitting the first node, selecting the first node for splitting, wherein selecting the first node for splitting comprises:
    ranking all nodes in the base network based on the computed norm of partial derivatives; and
    selecting the first node from among all nodes in the base network whose computed norm of partial derivatives is above a threshold value.

7. The method of claim 5, further comprising, prior to splitting the first node, selecting the first node for splitting, wherein selecting the first node for splitting comprises:
    ranking all nodes in a selected, single layer of the base network based on the computed norm of partial derivatives; and
    selecting the first node from among all nodes in the selected, single layer of the base network whose computed norm of partial derivatives is above a threshold value.

8. The method of claim 5, wherein computing the norm of partial derivatives over the first set of training data for each node in the base network comprises computing, for each node of the base neural network, the norm of the partial derivatives of the node.

9. The method of claim 5, wherein computing the norm of partial derivatives over the first set of training data for each node in the base network comprises computing, for each node, the norm of a gradient of weights on arcs coming into the node.

10. The method of claim 5, wherein computing the norm of partial derivatives over the first set of training data for each node in the base network comprises computing, for each node, the norm of a gradient of weights on arcs leaving the node.

11. The method of claim 1, wherein:
the method further comprises, prior to re-training the base neural network, generating, by the computer system, an ensemble of N ensemble member networks, wherein each of the N ensemble members is identical to the base neural, and such that one ensemble member corresponds to one and only one of each of the N groups of training data; and
the step of re-training the base neural network comprises training the ensemble, wherein, for each data item in the first set of training data that belongs to one of the N groups, training the ensemble comprises dropping from the training for that data item all ensemble members in the ensemble that do not correspond to the group for the data item.

12. The method of claim 11, wherein training the ensemble comprises, after dropping ensemble members for the first set of training data, training the ensemble without dropping ensemble members for a second set of training data that is different from the first set of training data.

13. The method of claim 1, wherein pre-training the base neural network comprises pre-training the base neural network to a desired performance level.

14. The method of claim 13, wherein pre-training the base neural network comprises pre-training the base neural network to convergence.

15. The method of claim 14, wherein pre-training the base neural network to convergence comprises iteratively pre-training the base neural network through gradient descent until a gradient of an applicable error cost function is below a threshold minimum.

16. The method of claim 1, wherein splitting the first set of training data into N groups comprises clustering training data items in the first set of training data into the N groups.

17. The method of claim 16, wherein clustering the first set of training data into the N clusters comprises:
generating a vector for each training example in the first set of training data; and
clustering the vectors into N clusters.

18. The method of claim 17, wherein generating the vector for each training example comprises generating, for each training example, a vector that comprises a set of partial derivatives for nodes in the base network.

19. The method of claim 17, wherein generating the vector for each training example comprises generating, for each training example, a vector that comprises a gradient of partial derivative of incoming arcs for one or more nodes of the base network.

20. The method of claim 17, wherein generating the vector for each training example comprises generating, for each training example, a vector that comprises a gradient of partial derivative of ongoing arcs for one or more nodes of the base network.

21. The method of claim 17, wherein generating the vector for each training example comprises generating, for each training example, a concatenated gradient vectors.

22. The method of claim 17, wherein clustering the vectors comprises clustering the vectors using a clustering algorithm.

23. The method of claim 17, wherein clustering the vector comprises training an autoencoder with a bottleneck layer.

24. The method of claim 1, wherein splitting the first set of training data into the N groups comprises:
computing a norm of partial derivatives over the first set of training data for each node in the base neural network; and
grouping the first set of training data into the N groups based on similarity of gradient direction.

25. A computer system for generating an improved neural network, the computer system comprising one or more computers, wherein the one or more computers comprise at least one processor and associated memory, wherein the associated memory stores software that when executed by the at least one processor, causes the at least one processor to:
pre-train a base neural network;
after pre-training, split a first set of training data into N groups of training data, where N>1, wherein the first set of training data are split into the N groups based on a similarity of a gradient direction of an error cost function with respect to the first set of training data, such that training data items in each of the N groups, respectively, have a similar gradient direction of the error cost function and such that the respective N groups have different gradient directions averaged over the training data items for each respective group; and
after splitting the first set of training data into the N groups, re-train the base neural network with the first set of training data, wherein the base neural network comprises N sub-network portions, and wherein each of the N sub-network portions is trained on a respective one of the N groups of training data.

26. The computer system of claim 25, wherein the at least one processor is programmed to:
prior to re-training the base neural network, split a first node of the base neural network into a node set that comprises N new nodes, such that one new node in the node set corresponds to one and only one of each of the N groups; and
re-train the base neural network by, for each data item in the first set of training data that belongs to one of the N groups, dropping from the re-training for that data item all nodes in the node set that do not correspond to the group for the data item.

27. The computer system of claim 26, wherein:
the first node, prior to splitting, comprises one or more incoming arcs and one or more outgoing arcs, with each of the incoming and outgoing arcs of the first node, prior to splitting, has a respective weight; and
the at least one processor is programmed to split the first node into the new node set by:
having each new node in the new node set have the same number of incoming and outgoing arcs as the first node prior to splitting; and
initializing the incoming and outgoing arcs of each new node in the new node set with equivalent weights as the first node prior to splitting, such that after the re-training, the weights for the incoming and outgoing arcs of each new node N in the new node set diverge.

28. The computer system of claim 26, wherein the at least one processor is programmed to re-train the base neural network by, after dropping nodes for the first set of training data, re-training the base neural network, with the new node set, without dropping nodes for a second set of training data that is different from the first set of training data.

29. The computer system of claim 26, wherein the at least one processor is programmed to group the first set of training data by:
   computing a norm of partial derivatives over the first set of training data for each node in the base neural network; and
   grouping the first set of training data into the N groups based on similarity of gradient direction.

30. The computer system of claim 29, wherein the at least one processor is programmed to, prior to splitting the first node, selecting the first node for splitting, wherein the at least one processor is programmed to select the first node for splitting by:
   ranking all nodes in the base network based on the computed norm of partial derivatives; and
   selecting the first node from among all nodes in the base network whose computed norm of partial derivatives is above a threshold value.

31. The computer system of claim 29, wherein the at least one processor is programmed to, prior to splitting the first node, selecting the first node for splitting, wherein the at least one processor is programmed to select the first node for splitting by:
   ranking all nodes in a selected, single layer of the base network based on the computed norm of partial derivatives; and
   selecting the first node from among all nodes in the selected, single layer of the base network whose computed norm of partial derivatives is above a threshold value.

32. The computer system of claim 29, wherein the at least one processor is programmed to compute the norm of partial derivatives over the first set of training data for each node in the base network by computing, for each node of the base neural network, the norm of the partial derivatives of the node.

33. The computer system of claim 29, wherein the at least one processor is programmed to compute the norm of partial derivatives over the first set of training data for each node in the base network by computing, for each node, the norm of a gradient of weights on arcs coming into the node.

34. The computer system of claim 29, wherein the at least one processor is programmed to compute the norm of partial derivatives over the first set of training data for each node in the base network by computing, for each node, the norm of a gradient of weights on arcs leaving the node.

35. The computer system of claim 25, wherein the at least one processor is programmed to:
   prior to re-training the base neural network, generate an ensemble of N ensemble member networks, wherein each of the N ensemble members is identical to the base neural, and such that one ensemble member corresponds to one and only one of each of the N groups; and
   re-train the base neural network by training the ensemble, wherein, for each data item in the first set of training data that belongs to one of the N groups, training the ensemble comprises dropping from the re-training for that data item all ensemble members in the ensemble that do not correspond to the group for the data item.

36. The computer system of claim 35, wherein the at least one processor is programmed to train the ensemble by, after dropping ensemble members for the first set of training data, training the ensemble without dropping ensemble members for a second set of training data that is different from the first set of training data.

37. The computer system of claim 25, wherein the at least one processor is programmed to pre-train the base neural network to a desired performance level.

38. The computer system of claim 37, wherein the at least one processor is programmed to pre-train the base neural network by pre-training the base neural network to convergence.

39. The computer system of claim 38, wherein the at least one processor is programmed to pre-train the base neural network to convergence by iteratively pre-training the base neural network through gradient descent until a gradient of an applicable error cost function is below a threshold minimum.

40. The computer system of claim 25, wherein the at least one processor is programmed to split the first set of training data into N groups by clustering the first set of training data into the N groups.

41. The computer system of claim 40, wherein the at least one processor is programmed to cluster the first set of training data into the N clusters by: generating a vector for each training example in the first set of training data; and clustering the vectors into N clusters.

42. The computer system of claim 41, wherein the at least one processor is programmed to generate the vector for each training example by generating, for each training example, a vector that comprises a set of partial derivatives for nodes in the base network.

43. The computer system of claim 41, wherein the at least one processor is programmed to generate the vector for each training example by generating, for each training example, a vector that comprises a gradient of partial derivative of incoming arcs for one or more nodes of the base network.

44. The computer system of claim 41, wherein the at least one processor is programmed to generate the vector for each training example by generating, for each training example, a vector that comprises a gradient of partial derivative of ongoing arcs for one or more nodes of the base network.

45. The computer system of claim 41, wherein the at least one processor is programmed to generate the vector for each training example by generating, for each training example, a concatenated gradient vectors.

46. The computer system of claim 41, wherein the at least one processor is programmed to cluster the vectors using a clustering algorithm.

47. The computer system of claim 41, wherein the at least one processor is programmed to cluster the vectors by training an autoencoder with a bottleneck layer.

48. The computer system of claim 25, wherein the at least one processor is programmed to split the first set of training data into the N groups by:
   computing a norm of partial derivatives over the first set of training data for each node in the base neural network; and
   grouping the first set of training data into the N groups based on similarity of gradient direction.

49. A computer system for generating an improved neural network, the computer system comprising:
- a first set of one or more processing cores for pre-training a base neural network to a desired performance level; and
- a second set of one or more processing cores for:
  - pre-train a base neural network;
  - after pre-training, splitting a first set of training data into N groups of training data, where N>1, wherein the first set of training data are split into the N groups based on a similarity of a gradient direction of an error cost function with respect to the first set of training data, such that training data items in each of the N groups, respectively, have a similar gradient direction of the error cost function and such that the respective N groups have different gradient directions averaged over the training data items for each respective group; and
  - re-train the base neural network with the first set of training data, wherein the base neural network comprises N sub-network portions, and wherein each of the N sub-network portions is trained on a respective one of the N groups of training data.

50. The computer system of claim 49, wherein the second set of one or more processing cores:
- are further for, prior to re-training the base neural network, splitting a first node of the base neural network into a node set that comprises N new nodes, such that one new node in the node set corresponds to one and only one of each of the N groups; and
- re-train the base neural network by, for each data item in the first set of training data that belongs to one of the N groups, dropping from the training for that data item all nodes in the node set that do not correspond to the group for the data item.

51. The computer system of claim 49, wherein the second set of one or more processing cores:
- are further for, prior to re-training the base neural network, generating an ensemble of N ensemble member networks, wherein each of the N ensemble members is identical to the base neural, and such that one ensemble member corresponds to one and only one of each of the N groups; and
- re-train the base neural network by training the ensemble, wherein, for each data item in the first set of training data that belongs to one of the N groups, training the ensemble comprises dropping from the training for that data item all ensemble members in the ensemble that do not correspond to the group for the data item.

* * * * *